UNITED STATES PATENT OFFICE.

FILIP KAČER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PRODUCING ANTHRAQUINONE-THIAZOLES.

1,095,731.     Specification of Letters Patent.     Patented May 5, 1914.

No Drawing.     Application filed February 27, 1913. Serial No. 751,096.

*To all whom it may concern:*

Be it known that I, FILIP KAČER, citizen of the German Empire, residing at Mannheim, Germany, have invented new and useful Improvements in Producing Anthraquinone-Thiazoles, of which the following is a specification.

I have discovered that thiazole derivatives of anthraquinone can be obtained simply and easily by treating a 2-amino-anthraquinone body, in which the ortho position to the amino group is occupied by hydrogen, with a benzo-trichlorid body in the presence of sulfur. If desired, the reaction can be carried out in the presence of a suitable solvent or diluent, such for instance as naphthalene, nitrobenzene, and trichlorbenzene. In this invention the employment of a compound which gives rise to sulfur is equivalent to the use of sulfur itself. As instances of such compound which give rise to sulfur, I mention sulfureted hydrogen and a metallic sulfid. In those cases in which, according to my invention, an anthraquinone compound containing more than one amino group in a beta position is employed for the purpose of producing compounds with more than one thiazole group, it is essential that each amino group have adjacent to it a position occupied by hydrogen. The products obtainable are in part valuable initial materials for the production of coloring matters, in part they are coloring matters themselves.

The following examples will serve to illustrate further the nature of my invention, which, however, is not confined to these examples. The parts are by weight.

Example 1: Boil together, for from 2 to 3 hours, 120 parts of naphthalene, 30 parts of 2-amino-anthraquinone, 20 parts of sulfur, and 40 parts of benzo-trichlorid. When the mixture has cooled to about from 110° to 120° C., add 420 parts of toluene and, when cold, filter off the anthraquinone-thiazole, wash it with toluene and dry it. It is identical with the thiazole obtainable from 1-mercapto-2-amino-anthraquinone and benzaldehyde, or benzoyl-chlorid and possesses a constitution corresponding to the formula

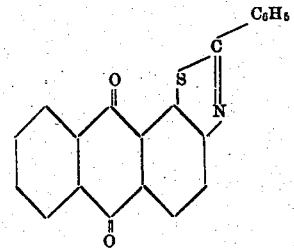

Example 2: Raise a mixture of 100 parts of naphthalene, 10 parts of 2.6-diamino-anthraquinone and 20 parts of powdered anhydrous sodium sulfid to the boiling point and add, slowly, 20 parts of benzotrichlorid. Continue boiling for 4 hours, then dilute with 350 parts of toluene. Filter off the product and wash it with toluene, alcohol and water, then dry it. The thiazole obtained is identical with that obtainable from 1.5-dimercapto-2.6-diamino-anthraquinone and benzaldehyde and possesses a constitution corresponding to the formula

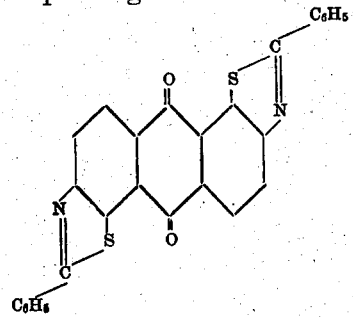

If desired, it can readily be purified by boiling it with sodium hypochlorite solution. It dyes cotton, from a vat, deep lemon-yellow shades of excellent fastness.

Example 3: Boil together 150 parts of benzo-trichlorid, 20 parts of 2.6-diamino-anthraquinone and 30 parts of sulfur, until the formation of the coloring matter is complete. At first a yellow solution is formed, from which, during the boiling, large quantities of yellow crystals separate out. These are filtered off, while the mixture is warm, and washed with benzo-trichlorid and alcohol, and then dried. The product is identical with that obtainable according to the foregoing Example 2 and is obtained in a good state of purity.

Example 4: Boil together 200 parts of naphthalene, 20 parts of 2.6-diamino-anthraquinone and 40 parts of benzo-trichlorid, and pass a strong current of sulfureted hydrogen into the boiling mixture until the formation of the coloring matter is complete. Then dilute with 700 parts of toluene, filter off the product, wash it with toluene and alcohol, and dry it. It is identical with the product of the foregoing Example 3.

Example 5: Boil together 100 parts of naphthalene, 10 parts of 2.6-diamino-anthraquinone, 5 parts of sulfur and 25 parts of 2.4-dichlor-benzo-trichlorid. When the reaction is finished, take up the melt with toluene, whereupon the product is obtained in a good state of purity, and constitutes a tetrachlor derivative of the thiazole described in the foregoing Examples 2, 3, and 4. It probably possesses a constitution corresponding to the formula

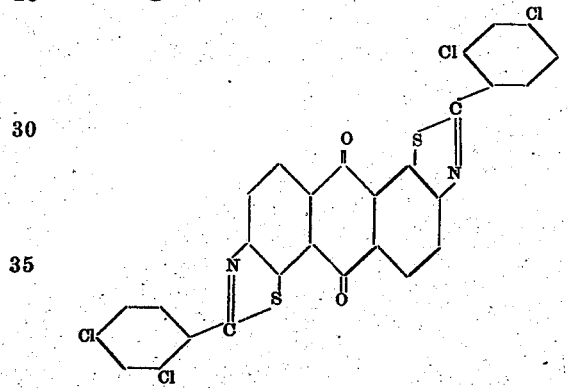

Example 6: Boil together, for from 1 to 2 hours, 150 parts of benzo-trichlorid, 30 parts of 2.7-diaminoanthraquinone and 15 parts of sulfur, and work up the product as described in the foregoing Example 3. The thiazol obtained is isomeric with that obtained from 2.6-diamino-anthraquinone and is also a vat coloring matter which dyes cotton deep lemon yellow, of excellent fastness.

Example 7: Boil together, for from 3 to 4 hours, 100 parts of ortho-dichlor-benzene, 20 parts of 2.3-amino-brom-anthraquinone, 10 parts of sulfur and 30 parts of benzo-trichlorid. When the mixture is cold, filter off the product, wash it with benzene, and dry it. Any sulfur remaining in admixture with the product can be extracted with carbon disulfid, or with sodium sulfid solution. The compound obtained is a bromin derivative of the thiazole obtained according to the foregoing Example 1.

Now what I claim is:—

1. The process of producing thiazole derivatives of the anthraquinone series by treating a 2-amino-anthraquinone body, in which the ortho position to the amino group is occupied by hydrogen, with a benzo-trichlorid body in the presence of sulfur.

2. The process of producing thiazole derivatives of the anthraquinone series by acting on 2.6-diamino-anthraquinone with benzo-trichlorid in the presence of sulfur.

In testimony whereof I have hereunto set my hand in the presence of two subscribing witnesses.

FILIP KAČER.

Witnesses:
  J. ALEC. LLOYD,
  JOSEPH PEIFFER.